United States Patent [19]

Colvin et al.

[11] Patent Number: 4,911,232
[45] Date of Patent: Mar. 27, 1990

[54] METHOD OF USING A PCM SLURRY TO ENHANCE HEAT TRANSFER IN LIQUIDS

[75] Inventors: David P. Colvin, Apex; James C. Mulligan, Raleigh, both of N.C.

[73] Assignee: Triangle Research and Development Corporation, Raleigh, N.C.

[21] Appl. No.: 344,062

[22] Filed: Apr. 27, 1989

Related U.S. Application Data

[63] Continuation-in-part of Ser. No. 222,185, Jul. 21, 1988, abandoned.

[51] Int. Cl.[4] .............................................. F28D 19/00
[52] U.S. Cl. .................................. 165/104.17; 165/10
[58] Field of Search ...................... 165/104.11, 104.17, 165/10

[56] References Cited

U.S. PATENT DOCUMENTS

| | | | |
|---|---|---|---|
| 3,596,713 | 8/1971 | Katz | 165/104.17 |
| 4,104,883 | 8/1978 | Naef | 165/104.17 |
| 4,512,388 | 4/1985 | Claar et al. | 165/104.11 |
| 4,608,309 | 8/1986 | Loh et al. | 428/409 |

OTHER PUBLICATIONS

Kiasza, K. E. et al., *Improvement . . . Using Phase—Change Slurry as . . . Heat—Transfer Storage Fluid,* Journal of Solar Energy Engineering, vol. 107, pp. 229–236, 8/1985.

Bahrami, P. A., *Heat Storage and Transport,* Jet Propulsion Lab., Calif. Institute of Tech., Pasadena, CA, (NASA Tech. Brief, vol. 8, No. 4, Item 61), 2/1985.

Primary Examiner—Albert W. Davis, Jr.
Attorney, Agent, or Firm—Robert G. Rosenthal

[57] ABSTRACT

A method of obtaining enhanced heat transfer in a closed loop thermodynamic system is disclosed. A two-component heat transfer fluid comprising a carrier fluid and a plurality of discrete reversible latent energy transition material particles. The fluid slurry is circulated about the loop and the loop is tuned so that a minimum temperature differential exists between the thermal source and sink in order to maximize the latent heat transport by adjustment of the heat transfer fluid flow rate, the rate of thermal energy input into the heat transfer fluid and the rate of cooling of heat transfer fluid.

3 Claims, 5 Drawing Sheets

METHOD OF USING A PCM SLURRY TO ENHANCE HEAT TRANSFER IN LIQUIDS

This application is a continuation-in-part of Ser. No. 222,185 filed July 21, 1988, now abandoned.

FIELD OF THE INVENTION

The present invention relates generally to tee field of slurries employed for heat transport and more specifically, to slurries that include a fluid and a phase change material (PCM) that are circulated through a thermal loop that is adjusted or tuned so that enhanced heat transfer is obtained.

BACKGROUND OF THE INVENTION

It is known to use fluids such as water and oils to transfer heat away from thermal systems. However, the capacity of a fluid to store and to later release thermal energy, known as specific heat or Cp, is limited to the range of approximately 0.2 to 1.0 BTU/Lb.°F. or kj/kg °C.

Increasing demands have been required of heat transfer fluids due to high temperature applications such as lasers, electronic systems and nuclear energy, where potentially large quantities of energy must be removed from a system in short periods of time, or in space applications, where minimizing pumping energy and overall system size or weight are the primary considerations.

As a result of the foregoing, efforts have been made to enhance the thermal energy storage and transfer capabilities of heat transfer fluids. One such attempt was made by Mehalick and Tweedy of General Electric. Their concept was a system composed of an encapsulated phase change material (PCM) slurried in water to comprise a water-heat transfer medium. Paraffins were chosen because of their congruent-melting behavior, wide range of melting points, low cost, and low supercooling. The paraffin was coated with either gelatin or a modified nylon in particle diameters from less than 50 microns to 2000 microns. The weight of the coating was from 10 to 25 per cent of the total particle weight. The best slurry contained 40 per cent by weight of the encapsulated PCM in water. This system claims to have had a heat storage capacity twice that of water under an 11 degree centigrade temperature change and had a heat-transfer rate within 70 to 80% of the transfer rate of a water system under similar conditions. The research was terminated before amarketable product was developed because of failure of the microcapsules in a pumpable slurry. (See Mehalick, E.M. and Tweedie, A.T., TWO-COMPONENT THERMAL ENERGY STORAGE MATERIAL, PROC. WORKSHOP SOL. ENERGY STORAGE SUBSYSTEMS FOR THE HEATING AND COOLING OF BUILDINGS, Lilleleht. .J., Ed., University Press of Virginia, Charlottesville, 1975, p. 85 and Mehalick, E.M. and Tweedie, A.T., TWO-COMPONENT THERMAL STORAGE MATERIAL STUDY, PHASE II, Report COO-2845-78/2, U.S. Department of Energy Washington, D.C., 1979.)

An idea similar to that of Mehalick and Tweedie is disclosed in French Patent WO 81/02163 to Naizot which discloses an energy-storage material contained in a metallic shell to form spherical particles with diameters between 10 and 1000 microns. These microcapsules were suspended in a liquid heat transfer fluid. The result was a heat-transfer fluid with improved heat-storage capacity. The aforementioned prior art systems are not without their limitations as they require a compromise to be made between PCM concentration (which enhances thermal energy storage as the concentration increases) and the pumpability of the slurry (which decreases as PCM concentration increases). Thus, while the prior art systems offered an improved thermal capacity they were nevertheless limited in usefulness and never achieved commercial success.

In view of the foregoing, it is an object of the present invention to provide a method of employing a PCM slurry that offers a significantly higher thermal storage and transport capacity than is available with current technology.

Another object of the present invention is to provide a method of employing a PCM slurry that significantly improves the heat transfer coefficient between the fluid and wall of a heat exchanger.

A further object of the present invention is to provide a method of employing a slurry that requires reduced pumping energy in order to be pumped for a given quantity of energy to be transported.

A still further object of the present invention is to provide a method of employing a slurry that reduces the size and weight of a thermal system required to cool a heat source.

SUMMARY OF THE INVENTION

To accomplish the foregoing objects, there is provided a method of obtaining enhanced thermal energy transfer between a thermal energy source and a heat transfer fluid in a closed thermodynamic system. A two component heat transfer fluid is circulated in proximity to the thermal energy source. The heat transfer fluid includes a carrier fluid and a plurality of discrete particles that undergo a reversible latent energy transition upon transfer of thermal energy thereto. The fluid is then circulated in proximity to a thermal radiator or energy sink so that thermal energy is removed therefrom. The system is tuned to a minimum change in temperature between the thermal energy source and the thermal energy sink in order to maximize the latent heat transport by adjusting the heat transfer fluid flow rate, the rate that thermal energy is input into the heat transfer fluid, and the rat at which the heat transfer fluid is cooled.

BRIEF DESCRIPTION OF THE DRAWINGS

Some of the features and advantages of the invention having briefly been described, others will appear from the detailed description which follows, when taken in connection with the accompanying drawings in which.

DETAILED DESCRIPTION OF THE ILLUSTRATED EMBODIMENT

While the present invention will be described more fully hereinafter with reference to the accompanying drawings, in which a particular embodiment is shown, it is to be understood at the outset that persons skilled in the art may modify the invention herein described while still achieving the favorable results of this invention. Accordingly, the description which follows is to be understood as a broad teaching disclosure directed to persons of skill in the appropriate arts and not as limiting upon the present invention.

Figure 2:
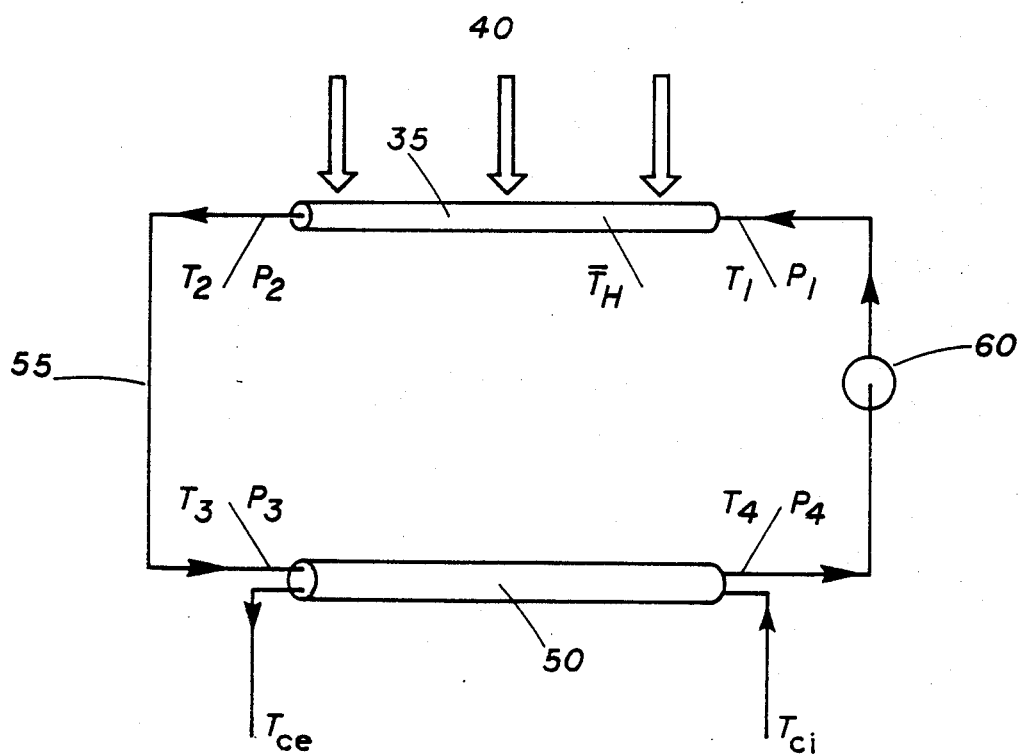
FIG. 2 is a schematic of a liquid coupled heat exchanger illustrating a typical heat source and a cooling or rejection heat exchanger.

Referring to FIG. 2, thermal energy is introduced on one side of the heat transport loop via the heat load add is removed on the other side by a rejection heat exchanger. A slurry is circluated through the system by means of a pump.

The slurry comprises a carrier fluid and a plurality of particles that undergo a reversible latent heat of fusion transition upon heating and cooling. More specifically, the carrier fluid can be almost any fluid depending upon the system requirements in which it must operate. Factors that influence the selection of a particular carrier fluid include temperature, toxicity, viscosity, pressure, etc. for manned spacecraft applications, system designers are more concerned with toxicity than efficiency and thus water would be employed instead of oils. On the other hand, laser or nuclear applications may require carrier fluids hat can operate at temperatures in the range of 700 degrees centigrade and in this case liquid metals would be employed. Electronics may require the use of dielectric fluids that can operate between 0 and 50 degrees centigrade.

The particles that actually carry the thermal energy can take different forms depending on the temperature requirements of a given application. For relatively low temperature applications, a phase change material is microencapsulated within a different material and for higher temperature applications, a solid/solid transition one component particle can be employed that undergoes solid/solid transition. For still higher temperatures, microencapsulated metals may be used consisting of a shell coating over a metal core material.

Figure 1:
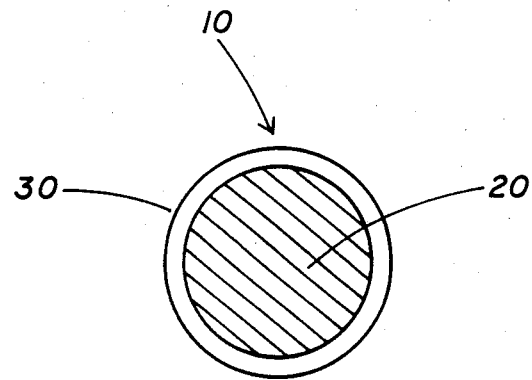
FIG. 1 is a cross-section of a microcapsule containing a phase change material as used in the present invention.

Microencapsulated phase change materials store their enhanced thermal energy in the form of a physical change of state as the core material melts or freezes, being isolated from the carrier fluid by a thin membrane or shell. FIG. 1 illustrates a microencapsulated particle with a core of phase change material and a thin shell of another material. Melted core material is thus contained within the surrounding shell and restricted from mixing with the carrier fluid or depositing in undesired locations upon cooling. The technology of microencapsulated phase change materials is well known to those skilled in tee art and further discussion is not deemed necessary.

The one-component, unencapsulated particles take the form of a powder suspended within the carrier fluid. At a temperature below their melting point, certain materials undergo a solid/solid energy transformation that also results in an enhanced intake or release of heat at a specific temperature. Both states of the material exhibit a specific endotherm and exotherm corresponding to the enhanced intake or release of heat. When the endotherm and exotherm are close enough together, possibility exists for tuning a closed loop circuit or system to exhibit significantly enhanced heat transport. Because the form of the material remains solid, a protective shell is not needed.

Exemplary of carrier fluids are the following:

| Common Name | Approximate Temperature Range |
|---|---|
| Water | >0 C. to <100 C. |
| Oils, silicone, hydrocarbon | >0 C. to <250 C. depending on formulation |
| Liquid sodium | >100 C. to <900 C. |
| Liquid lithium | >180 C. to <1400 C. |

Exemplary of latent energy transition materials are the following:

| Common Name | Approximate Transition Temperature |
|---|---|
| Water | 0 C. |
| Tetradecane | 5–6 C. |
| Hexadecane | 17–18 C. |
| Octadecane | 24–27 C. |
| Methyl Palmitate | 30–32 C. |
| Eicosane | 35–39 C. |
| Sodium | 98 C. |
| Lithium | 181 C. |
| Pentaerythritol | 184–186 C. |
| Neopentylglycol | 184–186 C. |
| Tin | 232 C. |
| Bismuth | 271 C. |
| Zinc | 420 C. |
| Barium | 725 C. |
| Eutectic alloys containing Bismuth, Cadmium, Indium, Lead, Tin | Various |

Exemplary of shell materials to encapsulate the latent energy transition materials are the following:
Polymers
Polyamids
Silver
Gold
Copper
Nickel
Cobalt According to the present invention the thermal capacitance of the fluid slurry may be increased many times that of the carrier fluid alone (from slightly above one to well over ten times).

Figure 4A:
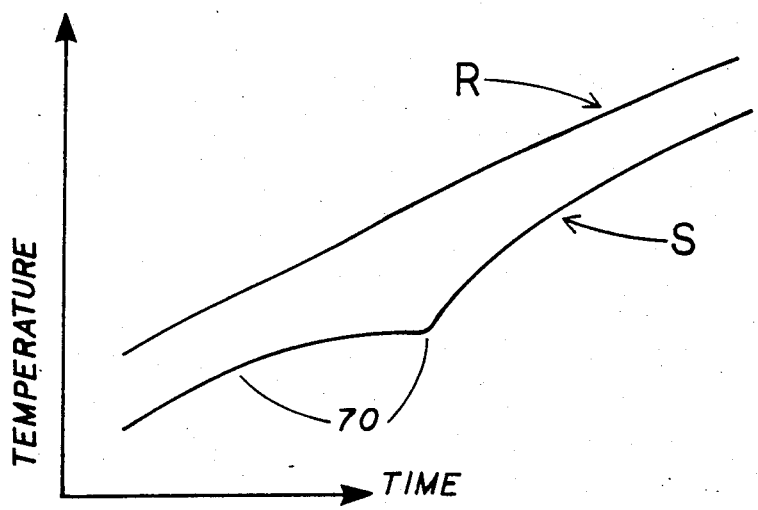
FIGS. 4a and 4b show the thermal characteristics of phase change material in heating (endotherm) and cooling (exotherm) cycles, illustrating the latent absorption (or release) of energy at a constant temperature in the plateau portions of the slurry temperature curves.
Figure 4B:
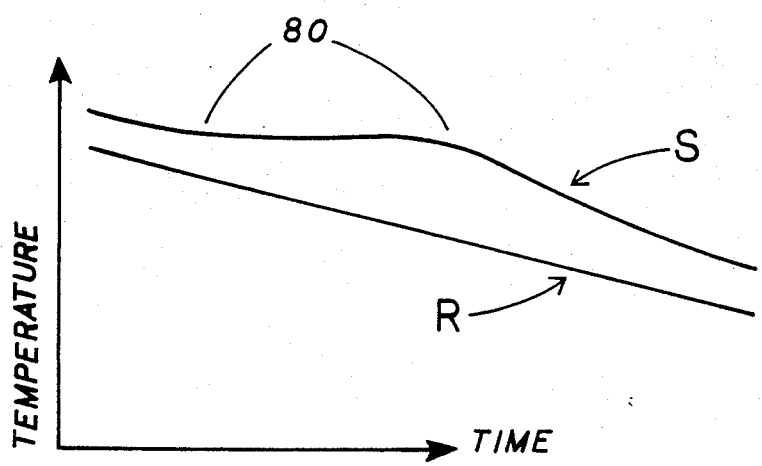

As illustrated in FIG. 4, the latent heat transition in both heating and cooling occurs in anisothermal plateau. Thus, by carefully adjusting the system parameters, almost all the heat acceptance and heat rejection in the PC slurry may be confined to the isothermal latent heat plateaus illustrated in FIG. 4. The result is greatly enhanced heat transport, with an attendant decrease in temperature differential across the loop.

Experimental evidence has been obtained to demonstrate the above described novel add enhanced behavior for heat transport. Unlike two-phase heat transport using liquid to gas heat transitions with its attendant high pressures and large changes in volume, the two-component thermal fluid slurry operates at low pressures and with very small changes in system volume (approximately fifteen percent). Within the slurry the microparticles store the majority of the thermal energy in the form of latent energy. The circulating loop is tuned to complete the endothermic energy capture just as the particles exit the source heat exchanger and then complete the exothermic energy release just as the particles exit the sink or rejection heat exchanger. The heat to be transferred then can occur across a very narrow temperature gradient between the endotherm and exothermic levels. FIG. 4 illustrates the endothermic and exothermic plateaus or levels exhibiting by a fluid slurry containing microencapsulated latent energy materials. If the temperature difference or thermal gradient between the thermal slurry endotherm and exotherm is small, it is possible to transport significantly more heat than sensible heat transport can provide under the same conditions of flow. It is this methodology that permits the enhanced nature for heat transport of the two-component thermal fluid slurry. Regardless of whether one uses microencapsulated phase change materials (solid/-liquid PCM's) or unencapsulated powders of materials (solid/solid PCM s) that exhibit similar endothermic ad exothermic temperature levels, the thermal fluid slurry can be tuned to produce enhanced heat transport characteristics (Cp greater than 0.2 to 1.0).

FIG. 3 illustrates the dependence of heat transferred with system flowrate, heating rate, and cooling rate. At aparticular combination of these variables, the system can be tuned to provide heat transport enhancement. This tunability is usually narrow, but its location can be determined by measurement of the temperatures of the fluid a it exits the source and sink heat exchangers. Conditions for optimal heat transport will exist when the difference in the fluid temperature is minimized between these points. When this occurs, it indicates that practically al of the thermal energy is being transported in the form of latent phase or chemical bond energy rather than sensible thermal energy that normally is attributed to the difference in temperature between these locations.

In general, the following three variables are available for adjustment in order to tune a PCM such as is described above:
1. Heat flux, or heat loaded into the PCM slurry.
2. Slurry flow rate.
3. Cooling capacity from the PCM slurry through the rejection heat exchanger.

A typical operating system may have either a fixed or variable heat load (flux) to be dissipated, and a cooling system utilizing chilled water or other coolant at a given inlet temperature and adjustable flow rate. The slurry is then pumped between the hot and cold sinks for heat transfer as illustrated in FIG. 2.

The temperature of the heat source must be higher than the melting temperature of the microencapsulated PCM, and the cooling temperature must be below the freezing temperature of the PCM.

The slurry flow rate must be adjustable through the laminar flow range or at least over the range of operation. The heat input and heat output heat exchangers may be of the type generally suitable to fluid flow heat transfer applications.

It should be noted that the melting and freezing temperature points of a substance are not normally the same. The plateaus in the heating or cooling curves illustrate the latent energy that must be absorbed or released in order to cause a material to change its physical state from a solid to a liquid or visa versa. The closer the melting and freezing temperatures of the PCM are to each other, the greater is the tuning effect, and the greater the thermal enhancement.

Figure 3D:
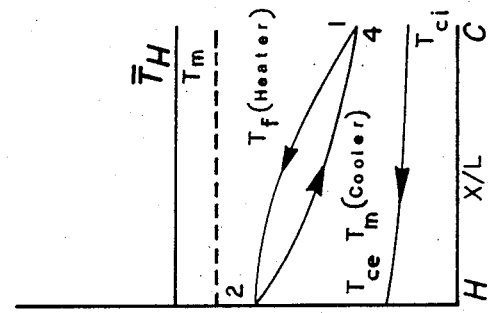
FIG. 3d illustrates the temperature profiles of the system in FIG. 2 where tee heating rate has been decreased so that the temperature swing of the PCM fluid always remains below the latent energy transition temperature, TM, and the energy transfer of the PCM fluid is all sensible.
Figure 3C:
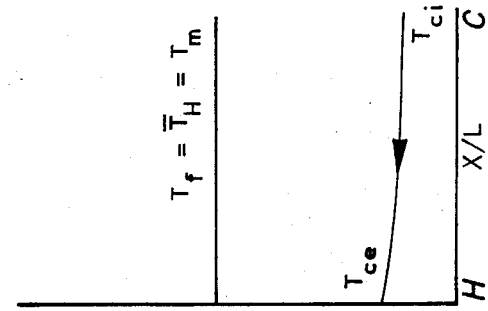
FIG. 3c illustrates the temperature profiles of FIG. 3b where the heating rate has been decreased so that the temperature swing of the PCM is centered on the latent energy transition temperature, TM, but there is no excursion in temperature above or below the value TM. The energy transfer of the PCM fluid in this case is completely latent, and represents optimal tuned system operation.
Figure 3B:
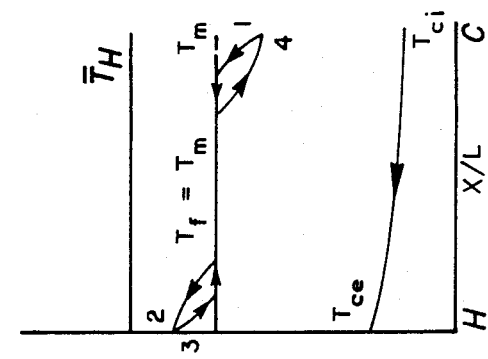
FIG. 3b illustrates the temperature profiles of FIG. 3a where the heating rate has been decreased so that the temperature swing of the PCM is centered on the latent energy transition temperature, TM. The energy transfer of the PCM fluid is both sensible and latent.
Figure 3A:
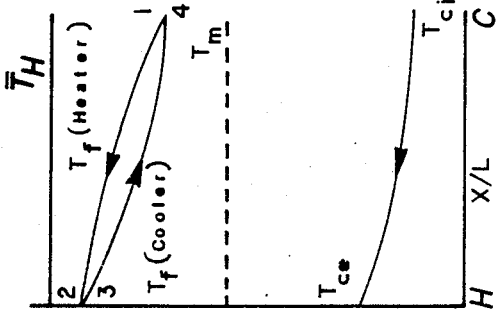
FIG. 3a illustrates the temperature profiles for one thermal cycle in the system of FIG. 2. In this figure, the temperature of the PCM slurry always remains above the latent energy transition temperature and the energy transfer of the slurry is all sensible.

FIG. 3 distinguishes between the untuned states (above or below the melting temperature FIGS. 3a–3d), the balanced state (FIG. 3b) and the optimally tuned state (FIG. 3c). As shown in FIG. 3b, the balanced system represents operation around the melting temperature, but FIG. 3c illustrates the practically isothermal condition wherein the temperature gradient $dT = T_3 - T_1$ is minimized. Although the dT can be made to approach zero degrees centigrade, losses in the system sometimes require a temperature differential on the order of a fraction of a degree (0.1 degree centigrade). The following represent actual experimental data illustrating the differences between the tuned, balanced and untuned states for the system variables listed.

| | Tuned | Balanced | Untuned | Units |
|---|---|---|---|---|
| EICOSANE IN WATER | | | | |
| $T_1$ | 35.50 | 32.50 | 27.50 | deg C. |
| $T_2$ | 35.90 | 35.30 | 33.10 | deg C. |
| $T_3$ | 35.90 | 35.40 | 34.70 | deg C. |
| $T_4$ | 35.30 | 32.90 | 27.50 | deg C. |
| $dT(T_3-T_1)$ | .44 | 2.90 | 6.62 | deg C. |
| $C_p$ | 10.15 | 1.20 | .98 | cal/(gm C.) |
| h | 1075.00 | 1026.23 | 626.25 | W/(M² C.) |
| Watts | 180.60 | 133.00 | 99.20 | W |
| OCTADECANE IN WATER | | | | |
| $T_1$ | 26.00 | 25.60 | 31.40 | deg C. |
| $T_2$ | 26.30 | 25.80 | 33.20 | deg C. |
| $T_3$ | 26.80 | 26.20 | 35.30 | deg C. |
| $T_4$ | 26.40 | 26.00 | 33.50 | deg C. |
| $dT(T_3-T_1)$ | .57 | .80 | 3.50 | deg C. |
| Cp | 7.21 | 1.89 | .94 | cal/(gm C.) |
| h | 810.98 | 752.34 | 526.70 | W/(M² C.) |
| Watts | 79.80 | 40.45 | 121.73 | W |
| HEPTADECANE IN WATER | | | | |
| $T_1$ | 21.30 | 20.40 | 22.20 | deg C. |
| $T_2$ | 21.90 | 21.10 | 31.60 | deg C. |
| $T_3$ | 21.30 | 21.50 | 26.60 | deg C. |
| $T_4$ | 21.20 | 20.90 | 21.10 | deg C. |
| $dT(T_3-T_1)$ | .10 | 1.08 | 4.21 | deg C. |
| Cp | 12.60 | 3.66 | 1.64 | cal/(gm C.) |
| h | 422.08 | 469.69 | 274.78 | W/(M² C.) |
| Watts | 49.13W | 49.13 | 49.13 | W |
| OCTADECANE IN DOW CORNING'S 200 5 CT. SILICONE | | | | |
| $T_1$ | 27.10 | 24.00 | 28.30 | deg C. |
| $T_2$ | 27.30 | 26.30 | 33.00 | deg C. |
| $T_3$ | 27.20 | 25.80 | 32.10 | deg C. |
| $T_4$ | 27.20 | 23.80 | 29.20 | deg C. |
| $dT(T_3-T_1)$ | .11 | 1.73 | 3.92 | deg C. |
| Cp | 16.22 | 1.56 | .64 | cal/(gm C.) |
| h | 238.65 | 212.11 | 122.57 | W/(M² C.) |
| Watts | 36.80 | 43.78 | 37.80 | W |

In view of the foregoing, the following procedure can be used to optimally tune a closed loop thermodynamic slurry system for optimal heat transfer.

First, with the heat source off, the slurry flow rate is adjusted into the laminar flow region. Those skilled in the art will be able to accomplish the foregoing for a first approximation of laminar flow.

Next, the flow rate of the cooling water flowing in the heat sink is adjusted to produce an outlet temperature that is below the freezing temperature of the PCM. For example, for a system transferring heat in the 50 watt range, a cooling temperature input 10 degrees centigrade below the PCM freezing point as been found to work well.

The heat source is then turned on and the system is allowed to approach steady state operation.

While observing $T_1$ (the slurry temperature entering the heater) and $T_3$ (the slurry temperature entering the rejection heat exchanger or thermal energy sink), the cooling flow rate is adjusted so as to cause $dT = T_3 - T_1$ to decrease to a minimum value. This step constitutes a coarse tuning of the system.

Next, the system is fine tuned by carefully adjusting the slurry flow rate to further minimize dT.

In a laboratory experiment using a 50 watt nominal heat transfer system, the minimum dT (across the system and between the heat source and sink) was less than 0. degree centigrade. After proper initial tuning, the system is essentially self-tuning upon start-up from an off condition if the previous adjustments are not altered. The order of turn-on remains: first adjust the slurry flow rate, second, adjust the level of cooling, and third, turn on the heat source. As the heating input approaches the previously tuned range, the dT will begin to decrease and fine tuning can then be accomplished as necessary by adjusting the slurry flow rate.

Figure 5:
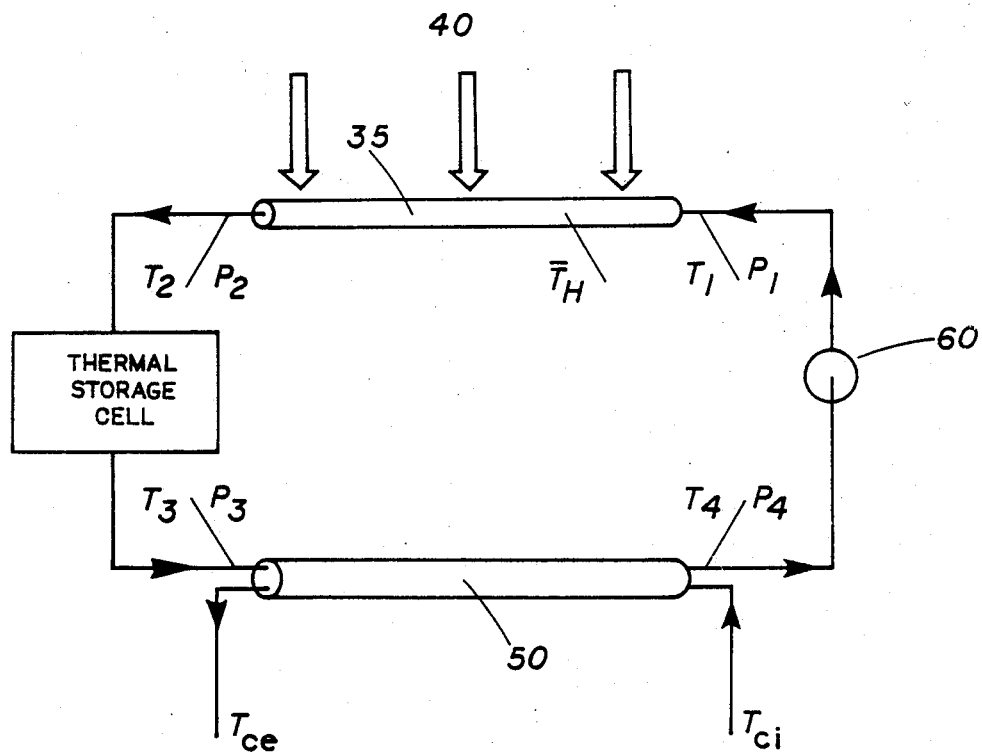
FIG. 5 is the schematic of FIG. 2 with the additon of an optional thermal energy storage cell.

In an actual system, a thermal slurry would be circulated in a closed loop between a heat load and a heat sink. The slurry material would be selected depending upon the temperature at which it was desired to operate the system. For optimal performance, the thermal slurry would be tuned to exhibit a minimum temperature gradient across the loop by varying the flow rate to balance the applied heat load. The ability for the tuned thermal slurry system to handle increased heat loads can be further enhanced by including a thermal storage cell within the loop as shown in FIG. 5. This storage unit not only extends the thermal storage of the system, but it improves the tuning of the loop and also permits the system to be designed for an average heat load condition rather than peak heat load.

The foregoing embodiments and examples are to be considered illustrative, rather than restrictive of the invention, and those modifications which come within the meaning and range of equivalence of the claims are to be included therein.

That which is claimed is:

1. A method of obtaining enhanced thermal energy transfer between a thermal energy source and a thermal energy sink in a closed loop thermodynamic system comprising the steps of:
   (a) circulating a two component heat transfer fluid in a close proximity to the thermal energy source, the heat transfer fluid including a carrier fluid and a plurality of discrete particles that undergo a reversible latent energy transition upon transfer of thermal energy to the fluid so that thermal energy is transferred thereto;
   (b) circulating the heat transfer fluid in proximity to a thermal energy sink so that thermal energy is removed therefrom;
   (c) tuning the closed loop thermodynamic system to a minimum change in temperature between the thermal energy source and the thermal energy sink in order to maximize the latent heat transport by adjusting the heat transfer fluid flow ate, the rate of thermal energy input into the heat transfer fluid, and rate of cooling of the heat transfer fluid, whereby the ability of the heat transfer fluid to absorb and transfer thermal energy is enhanced and the pumping power required to circulate the fluid is reduced.

2. The method according to claim 1 wherein the discrete particles comprise a microencapsulated phase change material.

3. The method according to claim 1 wherein the discrete particles comprise a material that undergoes a solid/solid phase transformation.

* * * * *

UNITED STATES PATENT AND TRADEMARK OFFICE
CERTIFICATE OF CORRECTION

PATENT NO. : 4,911,232

DATED : March 27, 1990

INVENTOR(S) : Colvin, et al

It is certified that error appears in the above-identified patent and that said Letters Patent is hereby corrected as shown below:

Column 3
Line 7, after "cycles" insert --respectively,--.
Line 36, after "loop" insert --35--.
Line 36, after "Load" insert --Q, indicated at 40--.
Line 37, after "exchanger" insert --50 circulating water through one of its loops--.
Line 38, after "slurry" insert --55--.
Line 38, after "pump" insert --60--.
Line 39, after "slurry" insert --55--.

Column 4
Line 2, after "particle" insert --generally indicated at 10--.
Line 3, after "core" insert --20--.
Line 3, after "shell" insert --30--.
Line 67, delete "figure 4" and insert --figures 4a and 4b--.
Line 68, after "cooling" insert --of the slurry S--.
Line 68, "anisothermal" should read "an isothermal--.
Line 68, after "plateau" insert --as compared with a reference bath R which shows no such plateau--.

Column 5
Line 4, delete "heat plateaus" and insert --melting plateau 70 and cooling plateau 80 as--.
Line 23, after "endothermic" insert --70--.
Line 24, after "exothermic" insert --80--.
Line 24, delete "exhibiting" and insert -- exhibited--.

UNITED STATES PATENT AND TRADEMARK OFFICE
CERTIFICATE OF CORRECTION

PATENT NO. : 4,911,232

DATED : March 27, 1990

INVENTOR(S) : Colvin et al.

It is certified that error appears in the above-identified patent and that said Letters Patent is hereby corrected as shown below:

Col. 5, line 40, after "cooling rate." insert -- The parameters contained therein are defined as follows:

$T_f$ = Fluid temperature
$T_h$ = Average temperature of heater
$T_a$ = Temperature of latent energy material fluid
$T_m$ = Latent energy transition temperature
$T_c$ = Coolant temperature, i = inlet, e = exit
$X/L$ = Cross section position in thermal loop between hot (H) and cold (C) --.

Signed and Sealed this

Thirteenth Day of April, 1993

Attest:

STEPHEN G. KUNIN

*Attesting Officer*   *Acting Commissioner of Patents and Trademarks*